United States Patent
Klarner et al.

(10) Patent No.: US 10,538,243 B2
(45) Date of Patent: Jan. 21, 2020

(54) DRIVER ASSISTANCE SYSTEM

(71) Applicant: Deutsches Zentrum für Luft- und Raumfahrt e.V., Köln (DE)

(72) Inventors: Robert Klarner, München (DE); Hartmut Runge, München (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 35 days.

(21) Appl. No.: 15/774,900

(22) PCT Filed: Feb. 1, 2017

(86) PCT No.: PCT/EP2017/052148
§ 371 (c)(1),
(2) Date: May 9, 2018

(87) PCT Pub. No.: WO2017/134102
PCT Pub. Date: Aug. 10, 2017

(65) Prior Publication Data
US 2018/0326977 A1    Nov. 15, 2018

(30) Foreign Application Priority Data

Feb. 3, 2016 (DE) .................. 10 2016 101 901

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 30/12* (2013.01);
(Continued)

(58) Field of Classification Search
CPC .... B60W 30/09; B60W 30/095; B60W 30/12; B60W 30/16; B60W 2550/14;
(Continued)

(56) References Cited

U.S. PATENT DOCUMENTS 9,851,214 B1 * 12/2017 Chintakindi ....... G01C 21/3691
2003/0149530 A1    8/2003 Stopczynski
(Continued)

FOREIGN PATENT DOCUMENTS

DE    10 2007 015 032 A1    1/2008
DE    10 2009 045 921 A1    4/2011
(Continued)

OTHER PUBLICATIONS

English translation of International Preliminary Report on Patentability issued in counterpart International Application No. PCT/EP2017/052148, pp. 1-6 (dated Aug. 7, 2018).

*Primary Examiner* — Gertrude Arthur Jeanglaude
(74) *Attorney, Agent, or Firm* — Hoffmann & Baron LLP

(57) ABSTRACT

Driver assistance system and method of assisting a driver when operating a vehicle in a transportation route network. The system includes a first interface to provide navigation data relating to the network, a position detection unit to provide a position of the vehicle, a second interface to provide first data relating to first objects, arranged along transportation routes of the network, a sensor system to sense current surroundings of the vehicle at the position in order to generate surroundings data, a first evaluation unit to determine second data relating to second objects based on the surroundings data, a fusion unit to match and fuse the first data and the second data to form third data, and a control unit to execute at least one assistance function in order to (Continued)

assist operation of the vehicle, wherein the assistance function is executed depending on the third data and the navigation data.

12 Claims, 2 Drawing Sheets

(51) Int. Cl.
  *B60W 30/12* (2006.01)
  *B60W 30/16* (2012.01)
  *G08G 1/16* (2006.01)

(52) U.S. Cl.
  CPC ......... *B60W 30/16* (2013.01); *B60W 2550/14* (2013.01); *B60W 2550/30* (2013.01); *B60W 2550/402* (2013.01); *G08G 1/165* (2013.01); *G08G 1/166* (2013.01)

(58) Field of Classification Search
  CPC ........ B60W 2550/30; B60W 2550/402; G08G 1/165; G08G 1/166
  USPC ......................................................... 701/301
  See application file for complete search history.

(56) References Cited

U.S. PATENT DOCUMENTS

| | | | |
|---|---|---|---|
| 2006/0235615 A1* | 10/2006 | Kato | ..................... B60W 40/04 701/300 |
| 2014/0032108 A1 | 1/2014 | Zeng et al. | |
| 2015/0348417 A1 | 12/2015 | Ignaczak et al. | |
| 2017/0101097 A1 | 4/2017 | Buchner et al. | |

FOREIGN PATENT DOCUMENTS

| | | |
|---|---|---|
| DE | 10 2012 000 896 A1 | 8/2012 |
| DE | 10 2013 220 487 A1 | 4/2015 |
| DE | 10 2014 212 478 A1 | 12/2015 |
| DE | 10 2015 108 366 A1 | 12/2015 |

* cited by examiner

DRIVER ASSISTANCE SYSTEM

CROSS REFERENCE TO RELATED APPLICATIONS

This application is the U.S. National Phase of, and Applicant claims priority from, International Patent Application No. PCT/EP2017/052148, filed on 1 Feb. 2017, and German Patent Application No. DE 10 2016 101 901.1, filed on 3 Feb. 2016, both of which are incorporated herein by reference in their entirety.

BACKGROUND

Field

The invention relates to a driver assistance system for assisting a driver when operating a vehicle in a transportation route network using an assistance function, as well as a method for assisting a driver when operating a vehicle in a transportation route network using an assistance function.

Discussion of Related Art

Driver assistance systems assist a driver when driving a vehicle, particularly dependent on information about the current surroundings of the vehicle. These surroundings are subject to change over time. For example, temporary construction sites can be set up on roads, a road may be blocked by an overturned truck, etc. Such changes in the local surroundings can either not be detected at all or only detected with a time delay and made available for consideration to driver assistance systems of vehicles. A multitude of assistance functions of driver assistance systems depend on the availability of reliable surroundings data.

SUMMARY

It is the problem of the invention to make available a driver assistance system which provides an improved assistance function which considers current, particularly suddenly occurring situations in the surroundings of a vehicle.

The invention is derived from the features of the independent claims. Advantageous further developments and embodiments are the subject matter of the dependent claims. Other features, applications, and advantages of the invention can be derived from the description below and the explanation of exemplary embodiments of the invention shown in the figures.

A first aspect of the problem is solved by a driver assistance system for assisting a driver when operating a vehicle F in a transportation route network using an assistance function UF. The proposed driver assistance system includes a first interface to provide navigation data ND relating to the transportation route network; a position detection unit to detect a position PF of the vehicle F; a second interface to provide at least following first data D1 relating to objects $O1_i$, the objects $O1_i$ being arranged along transportation routes of the transportation route network, where $i=1, 2, \ldots, I$, $I \geq 1$: object type $OA(O1_i)$, position $POS(O1_i)$ and risk index $INDEX(O1_i)$; a sensor system to scan current surroundings of the vehicle F at the position PF in order to generate surroundings data U(PF); a first evaluation unit to determine second data D2 relating to objects $O2_l$ based on the surroundings data U(PF), wherein the second data D2 relating to objects $O2_l$ include at least the following information, where $l=1, 2, \ldots, L$, $L \geq 0$: object type $OA(O2_l)$, position $POS(O2_l)$ and risk index $INDEX(O2_l)$, wherein the $INDEX(x)$ indicates a risk for the vehicle F and/or its occupants in a collision of the vehicle F with the respective object x; a fusion unit to match and fuse the first data D1 and the second data D2 to form third data D3=D3 (D1, D2), wherein the third data relates to objects $O3_v$, which are derived by matching and fusing of the first data D1 and the second data D2 from objects $O1_i$ and $O2_l$, where $v=1, 2, \ldots, V$, $V \geq 1$, $V \leq I+L$, and $O3_v \in \{O1_i, O2_l\}$, and wherein risk indices $INDEX(O3_v)$ are assigned to the objects $O3_v$ based on the risk indices $INDEX(O1_i)$ and $INDEX(O2_l)$; and an open-loop or closed-loop control unit to execute at least one assistance function UF in order to assist operation of the vehicle F, wherein the assistance function UF is executed in dependence on the third data and the navigation data ND, UF=UF(D3, ND).

The vehicle preferably is a motor vehicle, such as a car, a truck, or a bus.

As used herein, the term "assistance function" has a wider meaning. It particularly includes one or more of the following functions: output of information (warning, alert, optical, acoustic, haptic), activation or deactivation of a vehicle system or vehicle function, autonomous intervention in longitudinal and/or lateral control/closed-loop control of the vehicle. This list is not exhaustive, of course, and just indicates some examples of groups of assistance functions. The invention particularly relates to such assistance functions which are in some way related to current vehicle surroundings.

The navigation data ND advantageously include one or more of the following topographical data relating to the transportation route network: course, width, category (e.g., freeway, highway, local road, dirt road, etc.) of the transportation routes; number of lanes of a respective transportation route; intersections; junctions; underpasses and overpasses; locations of infrastructure facilities (gas stations, hospitals, railroad stations, airports, post office, hotels, monuments, etc.); mandatory action, traffic restrictions that apply to the respective section of the transportation routes, etc.; location and type of traffic lights, signposts; terrain elevations, including uneven surfaces, such as grooves, bumps; road boundaries, such as curbs, guard rails, concrete elements; ground surface type (this refers to the road itself and to the adjacent surroundings) such as water, snow, ice, sand, asphalt, concrete, sand, gravel, vegetation, lawn, etc.; a classification of the respective lateral surroundings of a transportation route with respect to elevation profile of the lateral surroundings (for example steeply sloping terrain on one side into a ravine or steeply rising terrain on one side, for example a rock wall); a classification of the lateral surroundings of a transportation route with respect to the type of ground surface; a classification of the lateral surroundings of a transportation route with respect to usability for the vehicle as maneuvering area. This enumeration is not exhaustive.

Advantageously, topographical information is available for an area of lateral surroundings directly along the transportation routes of the transportation route network, wherein the lateral surroundings on each side of the transportation routes is defined by a strip having a strip width A, wherein A is selected from the range [0, 500 m] and particularly is 50 m, 100 m, or 250 m. This limitation particularly reduces the volume of data to be kept available or to process. Respective topographical information can of course be provided for the entire ground surface of the transportation route network as part of the navigation data ND.

The position detection unit is advantageously configured to determine the position PF based on satellite navigation and includes a navigation receiver, which determines the position PF based on the GPS, Galileo, or GLONASS satellite navigation system. Alternatively or in addition, the position detection unit can use alternative methods for detecting the position known from prior art.

The second interface for providing the first data D1 relating to the objects $O1_i$ may for example be an interface to a memory unit in which the first data D1 are stored and which is advantageously arranged in the vehicle F, or an interface to a transmitter/receiver unit which receives the first data D1 wirelessly from a central server (for example via mobile Internet). The memory unit may for example be a CD ROM/RAM, a hard disk, or a variable, temporary memory. The objects $O1_i$ and the information relating to these objects $O1_i$ are advantageously detected by sensor systems when the respective areas are entered by driving or flying. Respective sensor systems are, for example, optical camera systems, radar systems, LIDAR systems, or combinations thereof. Advantageously, the objects $O1_i$ are arranged permanently, i.e., over a longer period of time, for example >one week or >one month, at their assigned position $POS(O1_i)$. Detecting the objects $O1_i$, subsequent analysis of the data detected, and the required distribution of the data D1 to respective driver assistance systems necessitates a time delay from detecting to providing the data D1 to the driver assistance systems of vehicles. This means that the data D1 do not indicate the current situation of objects arranged along the transportation routes.

As used herein, the term "objects $O1_i$" has a wider meaning. It advantageously includes all objects $O1_i$ which are arranged along transportation routes of the transportation route network and indicates their object type $OA(O1_i)$, their position $POS(O1_i)$, and their risk index $INDEX(O1_i)$. The $INDEX(O1_i)$ indicates a risk for the vehicle F and/or its occupants in a collision with the respective object $O1_i$. In an advantageous variant, the risk of the vehicle F and/or its occupants increases in a collision of the vehicle F with an object $O1_i$ with an increasing index value $INDEX(O1_i)$. The index value is advantageously normed, for example to 1 or 100.

The proposed driver assistance system advantageously includes a memory unit for storing the first data D1 and a transmitting/receiving unit with which first data D1* can be transferred via a mobile data transfer from a central server for updating the first data D1 stored in the memory unit. In this way, a central server can centrally collect, evaluate, and transmit information relating to the first data to vehicles or their driver assistance systems, respectively. The first data D1 provided to driver assistance systems of the type are thus more current.

The sensor system allows detection of the current surroundings of the vehicle at the respective position PF of the vehicle and generation of surroundings data U(PF). The sensor system preferably includes one or several of the following systems: Camera system, infrared system, LIDAR system, RADAR systems, SODAR systems, ultrasound system. The sensor system is used to detect and/or scan vehicle surroundings. Advantageously, the surroundings are scanned continuously, such that current surroundings data U(PF, t) are generated at any time t. Advantageously, the surroundings data U(PF) detected by the sensor system are evaluated with respect to one or several pieces of the following information: 3D shape of the objects $O2_j$, type of the objects $O2_j$, positioning of the objects $O2_j$ relative to the vehicle, dynamic state of the objects $O2_j$, meteorological conditions in the vehicle surroundings, type and condition of the transportation route traveled by the vehicle F.

The surroundings data U(PF, t), preferably generated continuously, are evaluated by the first evaluation unit. In this process, objects $O2_j$ mapped in the surroundings data U(PF, t) are determined. Furthermore, the object type $OA(O2_j)$ of the objects $O2_j$ is determined. The object type $OA(O2_j)$ indicates the type of a respective object, such as a boulder, a car, a guard rail, a tree, an advertising pillar, a traffic light, a bridge pier, a gravel area, a curb, a person, a cyclist, a deer, etc. This evaluation is advantageously based on known image evaluation algorithms and a respective reference database. In addition to the object type $OA(O2_j)$, the surroundings data U(PF, t) are also evaluated with respect to the position $POS(O2_j)$ of the respective objects $O2_j$. The position is advantageously determined relative to the vehicle or as an absolute value, based on the position PF that is known in the vehicle. Finally, a risk index INDEX $(O2_j)$, which indicates a risk for the vehicle F and/or its occupants in a collision of the vehicle with the respective object $O2_j$, is determined for the detected objects $O2_j$.

Advantageously, the risk indices $INDEX(O2_j)$ for the respective objects $O2_j$ are determined depending on the determined object type $OA(O2_j)$: $INDEX(O2_j)=INDEX(OA(O2_j))$. Advantageously, the risk indices $INDEX(O2_j)$ are provided as a lookup table.

The second data D2 determined by the sensor system thus reflect the current state of the vehicle surroundings. If no changes regarding the objects $O1_i$ located in a road section for which the data D1 is known have occurred in the time until the surroundings data U(PF,t) is detected and the sensor system is configured and operated such that all these objects $O1_i$ are detected, the following applies: i=l, 1=L and $O1_i=O2_j$. Typically, however, there will be changes of the objects arranged in the surroundings of a transportation route over time, such that I≠L applies. In these cases, the sensor system will detect more or fewer objects in the detected surroundings data U(PF,t) than in the data D1 provided.

The fusion unit is now used to consolidate and fuse the first data D1 and the second data D2 to form third data D3=D3(D1, D2), wherein the third data D3 relate to objects $O3_y$, which result from matching and fusing the first data D1 and the second data D2 from the objects $O1_i$ and $O2_j$. The "fusion" is primarily a data fusion aimed at utilizing all available information from the first data D1 and the second data D2 to determine a current image or current state of the vehicle surroundings with respect to the objects arranged therein. In the data fusion, the information of the second data D2 take priority over those of the first data D1, i.e., if an object $O2_j$ is detected in the second data D2, which is not contained in the first data D1, it will be taken into account as an object $O3_y$ in the third data D3. But if an object $O2_j$ which is contained in the first data D1 is not detected in the second data D2, it will not be taken into account as an object $O3_y$ in the third data D3.

Using suitable data fusion methods and respective reconciliation filters, third data D3 can be determined which provide an actual image of the objects $O3_y$ arranged in the vehicle surroundings or their object types $OA(O3_y)$. This increases the reliability of the driver assistance system, and most ambiguities can be excluded.

Risk indices $INDEX(O3_y)$ are assigned to the objects $O3_y$ based on risk indices $INDEX(O1_i)$ and $INDEX(O2_j)$. This is preferably done by carrying over the indices already known for the respective objects: $INDEX(O1_i)$ or $INDEX(O2_j)$, this means for a given object, which for example is designated D1 as $O1_{i=2}$, and in the data D2 as $O2_{j=5}$, that the object becomes $O3_{y=3}$. The associated risk indices may for example have the following values: $INDEX(O1_{i=2})=3$, INDEX $(O2_{j=5})=4$, wherein a higher risk index value indicates a higher risk for the vehicle or its occupants, respectively, in a collision of the vehicle with the object. In this example, the object $O3_{v=3}$ is preferably assigned the index value INDEX $(O2_{v=3})=4$.

Finally, the open-loop and/or closed-loop control unit executes the assistance function UF depending on the third data and the navigation data ND, UF=UF(D3, ND).

Advantageously, the risk indices $INDEX(O1_i)$ for the respective objects $O1_i$ are determined based on one or several of the following parameters: shape of the object $O1_i$, extension of the object $O1_i$, mass of the object $O1_i$, stiffness of the object $O1_i$, distance of the object from the road, arrangement of the object relative to neighboring objects and relative to the road.

If no unique risk index $INDEX(O2_j)$ can be determined for an object $O2_j$, the respective object $O2_j$ is advantageously assigned an $INDEX(O2_j)$ which corresponds to the highest risk for the vehicle F and/or its occupants in a collision of the vehicle with the respective object $O2_j$. This is in line with the philosophy according to which the greatest possible safety requirements should apply if conditions are unclear.

An advantageous further development of the proposed driver assistance system is characterized in that a second evaluation unit is provided to determine open spaces $FF_p$ which the vehicle F can use without risk in its current surroundings, where p=1, 2, . . . , wherein the second evaluation unit determines the usable open spaces $FF_p$ taking into account the navigation data ND and/or the first data D1 and/or the second data D2 and/or the third data D3, and the assistance function UF is executed depending on the determined open spaces $FF_p$, UF=UF(D3, ND, $FF_p$).

The second evaluation unit advantageously resorts to the surroundings data U(PF,t) detected by the sensor system. The open spaces $FF_p$ which the vehicle F can use without risk are advantageously determined based on a respective image data evaluation, optionally combined with respective distance data of the surroundings data U(PF,t).

An advantageous further development of the proposed driver assistance system is characterized in that the first unit performs a correspondence check of the first data D1 and the second data D2 and gives priority to the respective second data D2 if there are any discrepancies. This ensures that priority is always given to the most current data. It will be appreciated that the second data D2 must have an accordingly high reliability for this purpose.

An advantageous further development of the proposed driver assistance system is characterized in that a third interface provides a current driving status Z(t) of the vehicle, a third unit determines based on the driving status Z(t) whether the driving status Z(t) is a safe or an unsafe driving status, and if the third unit determines an unsafe driving status, the open-loop and/or closed-loop control unit executes an assistance function UF which performs autonomous intervention in longitudinal and/or lateral control/closed-loop control of the vehicle F, such that predicted collision of the vehicle F with objects $O3_v$ located in the surroundings of the vehicle F is prevented, or, if predicted collision prevention is not possible, a controlled collision of the vehicle F with an eligible object $O3_v$ in the vehicle surroundings, which has the relatively lowest risk index value $INDEX(O3_v)$, is initiated in a targeted manner.

The driving status Z(t) advantageously includes all essential dynamic variables of the vehicle, such as: position, speed, acceleration, as well as steering angle, steering angle speed, steering angle acceleration, mass of the vehicle, selected gear, braking status, etc. Advantageously, the driving status Z(t) of the vehicle F also includes surroundings conditions such as the current adhesive friction/rolling friction/sliding friction of the wheels, ambient temperature, and ambient humidity. As used herein, a "safe driving status Z(t)" is a condition in which the vehicle F can safely be maneuvered in the lane by the driver and/or a driver assistance system. An "unsafe driving status Z(t)" is for example a condition in which the vehicle F is in danger to no longer be safely maneuverable in the lane by the driver or a driver assistance system but the vehicle F is threatening to deviate from the intended travel path in a more or less uncontrolled manner. The intervention time of the autonomous intervention in longitudinal and/or lateral control is defined by the predetermined features of the "unsafe driving status Z(t)". Advantageously, the features that define an "unsafe driving status Z(t)" can be selected from a list or predetermined by the driver. In this way, the autonomous intervention in longitudinal and/or lateral control can be set to activate in a state which will never let the vehicle get into an actually unsafe driving status. On the other hand, the "unsafe driving status Z(t)" can also be defined such that the autonomous intervention in longitudinal and/or lateral control is activated only if the vehicle can no longer keep the intended travel path, for example due to physical reasons.

If, in this further development, such an "unsafe driving status" is detected, autonomous intervention in longitudinal and/or lateral control such that a collision with each of the objects $O3_v$ arranged along the course of the road, advantageously predicted based on the current driving status Z(t) and the further course of the road, will be prevented. If predicted collision prevention should not be possible, which also results from a respective prediction, longitudinal and/or lateral control of the vehicle is triggered such that a collision with one of the objects $O3_v$ is initiated in a targeted manner, wherein the object is characterized in that damage to the vehicle or occupants of the vehicle from the collision is as minimal as possible, that is, if available, an object $O3_v$ is selected that is as resilient, deformable, lightweight and small as possible, for example, a guard rail.

An advantageous further development of the proposed driver assistance system is characterized in that the system further includes a unit for determining the most probable route FR of the vehicle F based on a current position PF of the vehicle F, a third interface for providing a current driving status Z(t) of the vehicle, and a prediction unit, wherein the prediction unit determines a risk R based on the route FR, the current driving status Z(t), and the third data D3, where R=R(FR, Z(t), D3), which risk indicates a probability of occurrence of a critical driving situation for the vehicle F and the route FR ahead, wherein the determined risk R is output and, if a critical driving situation occurs, the open-loop and/or closed-loop control unit performs an assistance function UF in which autonomous intervention in longitudinal and/or lateral control of the vehicle F is triggered in such a manner that it prevents a predicted collision of the vehicle F with objects $O3_v$ located in the surroundings of the vehicle F or, if predicted collision prevention is not possible, causes a controlled collision of the vehicle F with an eligible object $O3_v$ in the vehicle surroundings in a targeted manner, which object has the relatively lowest risk index value $INDEX(O3_v)$.

It is assumed that no or only minimal damage to the vehicle F or the occupants will occur due to the prevention of a collision with one of the objects $O3_v$ by the automatically initiated maneuver (automatic longitudinal and/or lateral control of the vehicle).

A second aspect of the problem is solved by a method for assisting a driver when operating a vehicle F in a transportation route network using an assistance function UF. The proposed method includes the following steps. In one step, navigation data ND relating to the transportation route network are provided. In another step, a position PF of the vehicle F is detected. In another step, at least the following first data D1 relating to objects $O1_i$ are provided, which are arranged along transportation routes of the transportation route network, where i=1, 2, . . . , I, I≥1: object type $OA(O1_i)$; position $POS(O1_i)$, and risk index $INDEX(O1_i)$. In another step, the current surroundings of the vehicle F are scanned at the position PF to generate surroundings data U(PF). In another step, data D2 relating to objects $O2_l$ are determined based on surroundings data U(PF), wherein the data D2 relating to objects $O2_l$ at least includes following information, wherein l=1, 2, . . . , L, L≥0: object type $OA(O2_l)$, position $POS(O2_l)$, and risk index $INDEX(O2_l)$, wherein the INDEX(x) indicates a risk of the vehicle F and/or its occupants in a collision of the vehicle with the respective object x. In another step, the first data D1 and the second data D2 are matched and fused to form third data D3=D3(D1, D2), wherein the third data relate to objects $O3_v$ which result from matching and fusing the first data D1 and the second data D2 from objects $O1_i$ and $O2_l$, where v=1, 2, . . . V, V≥1, V≤I+L, and $O3_v \in \{O1_i, O2_l\}$, and wherein risk indices $INDEX(O3_v)$ are assigned to the objects $O3_v$ based on risk indices $INDEX(O1_i)$ and $INDEX(O2_l)$. Finally, at least one assistance function UF is executed in order to assist operation of the vehicle F, wherein the assistance function UF is executed depending on the third data and the navigation data ND, UF=UF(D3, ND).

Advantages and advantageous further developments result from applying and transferring the statements made above on the driver assistance system according to the invention mutatis mutandis and analogously.

BRIEF DESCRIPTION OF THE DRAWINGS

Other advantages, features, and details can be derived from the description below, in which at least one exemplary embodiment is described in detail and with reference to the drawing, where appropriate. Identical, similar, and/or functionally identical parts were assigned the same reference symbols.

In the drawings.

DETAILED DESCRIPTION

Figure 1:
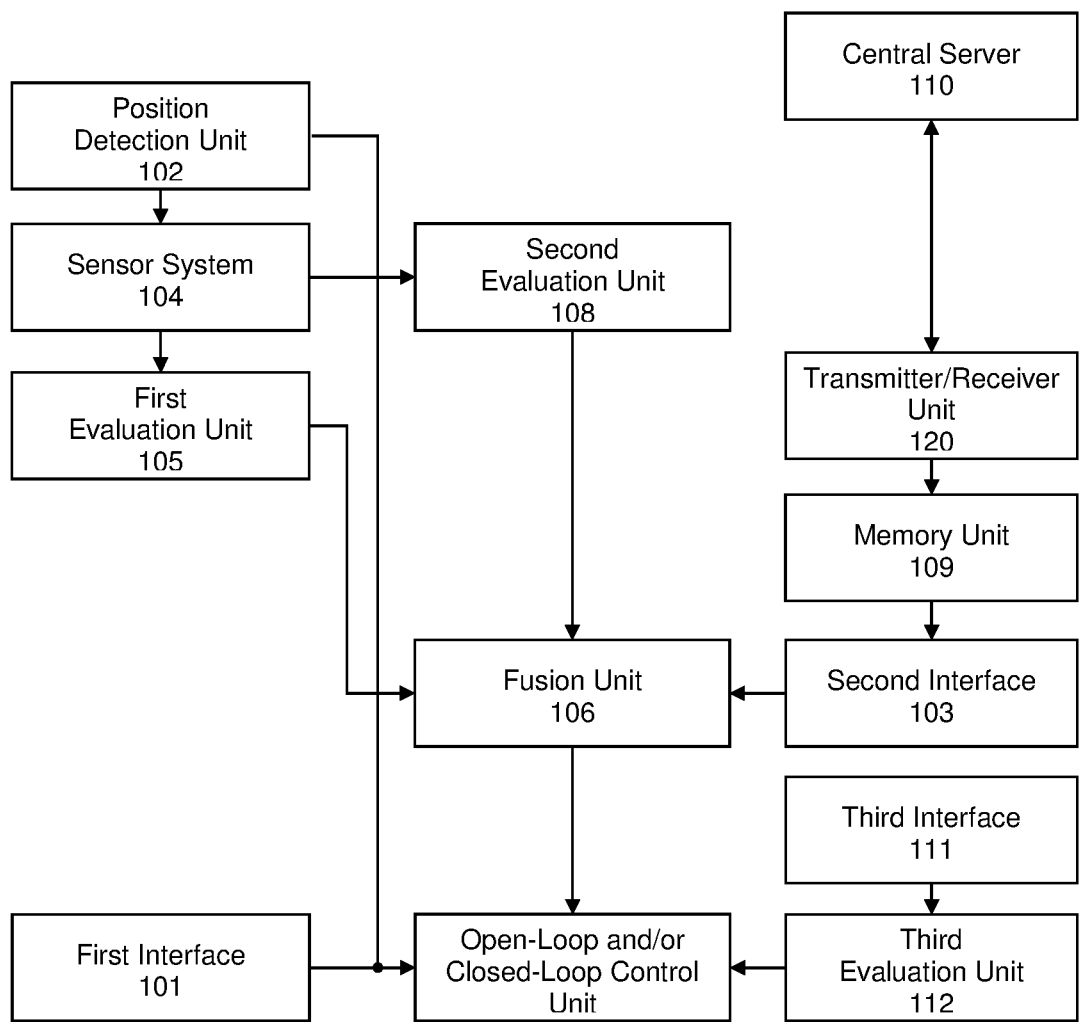
FIG. 1 shows a schematic structure of a driver assistance system according to the invention.

FIG. 1 shows a schematic structure of a driver assistance system according to the invention for assisting a driver when operating a vehicle F in a transportation route network using an assistance function UF. The driver assistance system includes a first interface 101 to provide navigation data ND relating to the transportation route network; a GPS position detection unit 102 to detect a position PF of the vehicle F; a second interface 103 to provide at least the following first data D1 relating to objects $O1_i$, which are arranged along transportation routes of the transportation route network, where i=1, 2, . . . , 1, I≥1: object type $OA(O1_i)$, position $POS(O1_i)$ and risk index $INDEX(O1_i)$; a sensor system 104 to sense current surroundings of the vehicle F at the position PF in order to generate surroundings data U(PF); a first evaluation unit 105 to determine data D2 relating to objects $O2_l$ based on surroundings data U(PF), wherein the data D2 relating to objects $O2_l$ include at least the following information, where l=1, 2, . . . , L, L≥0: object type $OA(O2_l)$, position $POS(O2_l)$, and risk index $INDEX(O2_l)$, wherein the INDEX(x) indicates a respective risk for the vehicle F and/or its occupants in a collision of the vehicle with the respective object x; a fusion unit 106 to match and fuse the first data D1 and the second data D2 in order to form third data D3=D3(D1, D2), wherein the third data relates to objects $O3_v$ which are derived by matching and fusing of the first data D1 and the second data D2 from objects $O1_i$ and $O2_l$, where v=1, 2, . . . V, V≥1, V≤I+L, and $O3_v \in \{O1_i, O2_l\}$, and wherein risk indices $INDEX(O3_v)$ are assigned to the objects $O3_v$ based on the risk indices $INDEX(O1_i)$ and $INDEX(O2_l)$; and an open-loop or closed-loop control unit 107 to execute the at least one assistance function UF in order to assist operation of the vehicle F, wherein the assistance function UF is executed in dependence on the third data and the navigation data ND, UF=UF(D3, ND).

Furthermore, the system includes a second evaluation unit 108 to determine open spaces $FF_p$ which the vehicle F can use without risk in its current surroundings, where p=1, 2, . . . , wherein the second evaluation unit 108 determines the usable open spaces $FF_p$ taking into account the navigation data ND and/or the first data D1 and/or the second data D2 and/or the third data D3, and the assistance function UF is executed depending on the determined open spaces $FF_p$, UF=UF(D3, ND, $FF_p$). The fusion unit 106 advantageously matches the open spaces $FF_p$ determined by the evaluation unit 108 with the data D1 and data D2.

Furthermore, the system includes a memory unit 109 to store the first data D1 and a transmitting/receiving unit 120 to transfer first data D1* via a mobile data transfer from a central server 110 to the memory unit 109 in order to update the first data D1 stored in the memory unit 109.

Furthermore, the system includes a third interface 111, which provides a current driving status Z(t) of the vehicle F, and a third evaluation unit 112, which determines based on the driving status Z(t) whether the driving status Z(t) is a safe or an unsafe driving status, and if the third evaluation unit 112 determines an unsafe driving status, the open-loop and/or closed-loop control unit 107 executes an assistance function UF which performs autonomous intervention in longitudinal and/or lateral control/closed-loop control of the vehicle F, such that a predicted collision of the vehicle F with objects $O3_v$ located in the surroundings of the vehicle F is prevented, or, if predicted collision prevention is not possible, a controlled collision of the vehicle F with an eligible object $O3_v$ in the surroundings of the vehicle F, which has the relatively lowest risk index value $INDEX(O3_v)$, is initiated in a targeted manner.

Figure 2:
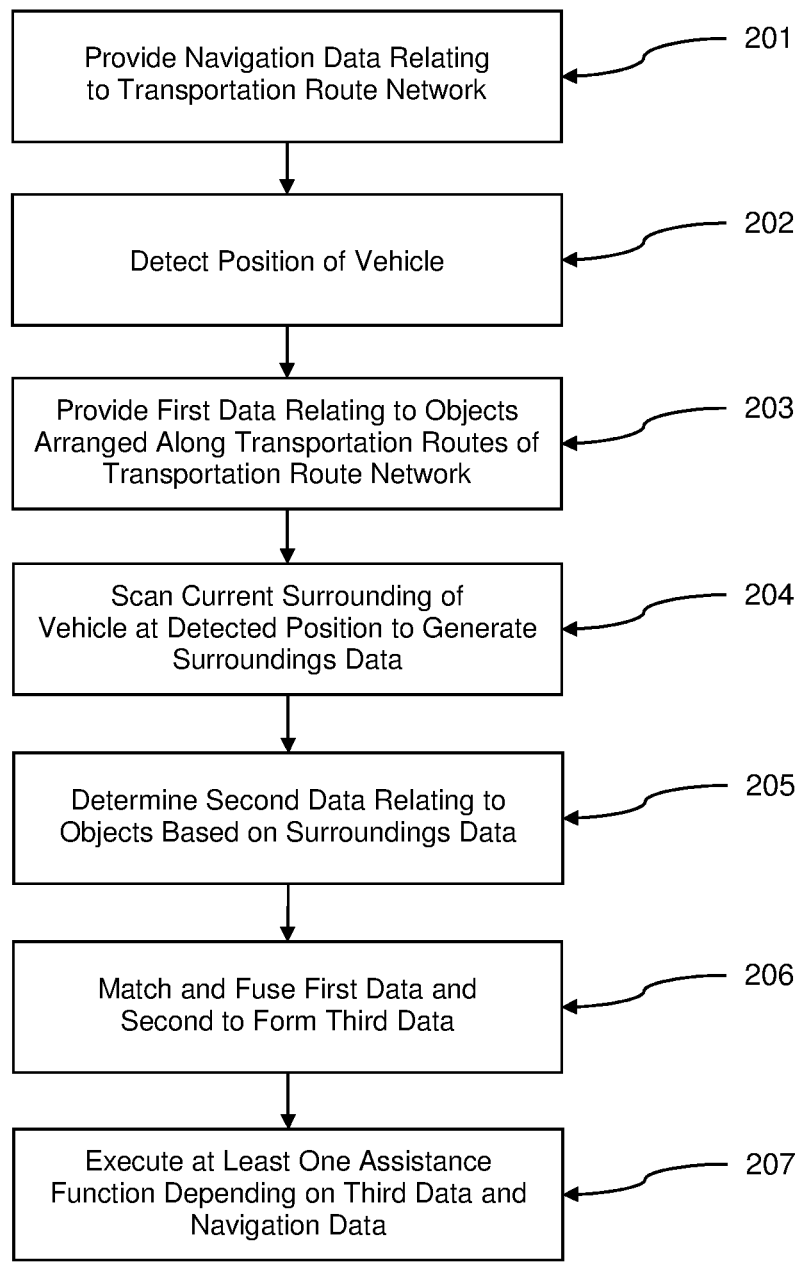
FIG. 2 shows a schematic flow diagram of a method according to the invention.

FIG. 2 shows a schematic flow diagram of a method according to the invention for assisting a driver when operating a vehicle F in a transportation route network using an assistance function UF. The proposed method includes the following steps. In a step 201, navigation data ND relating to the transportation route network is provided. In another step 202, a position PF of the vehicle F is detected. In another step 203, at least the following first data D1 is provided relating to objects $O1_i$, which are arranged along transportation routes of the transportation route network, where i=1, 2, . . . , I, I≥1: object type $OA(O1_i)$, position $POS(O1_i)$, and risk index $INDEX(O1_i)$. In another step 204, the current surroundings of the vehicle F are scanned at the position PF to generate surroundings data U(PF).

In another step 205, data D2 relating to objects $O2_j$ is determined based on surroundings data U(PF), wherein the data D2 relating to objects $O2_j$ at least includes the following information, wherein l=1, 2, ..., L, L≥0: object type $OA(O2_j)$, position $POS(O2_j)$, and risk index $INDEX(O2_j)$, wherein the INDEX(x) indicates a risk of the vehicle F and/or its occupants in a collision of the vehicle with the respective object x. In another step 206, the first data D1 and the second data D2 are matched and fused in order to form third data D3=D3(D1, D2), wherein the third data relate to objects $O3_v$ which result from matching and fusing of the first data D1 and the second data D2 from objects $O1_i$ and $O2_j$, where v=1, 2, ... V, V≥1, V≤I+L, and $O3_v \in \{O1_i, O2_j\}$, and wherein risk indices $INDEX(O3_v)$ are assigned to the objects $O3_v$ based on risk indices $INDEX(O1_i)$ and $INDEX(O2_j)$. In another step 207, at least one assistance function UF is executed in order to assist operation of the vehicle F, wherein the assistance function UF is executed depending on the third data and the navigation data ND: UF=UF(D3, PF, ND).

Although the invention was described in detail using preferred exemplary embodiments, the invention is not limited by the disclosed examples, and a person skilled in the art can derive other variations from it without leaving the scope of protection of the invention. It will therefore be appreciated that a plurality of variation options exists. It will also be appreciated that embodiments mentioned as examples are indeed just examples, which should not be interpreted as limiting, for example, the scope of protection, potential applications, or the configuration of the invention. Instead, the above description and description of figures enable a person skilled in the art to implement the exemplary embodiments in detail, wherein the person skilled in the art, knowing the disclosed rationale of the invention, can make manifold changes, for example with respect to the function or arrangement of individual elements mentioned in an exemplary embodiment, without leaving the scope of protection which is defined by the claims and their legal equivalents, such as the further explanation in the description.

LIST OF REFERENCE SYMBOLS

101 First interface
102 Position detection unit
103 Second interface
104 Sensor system
105 First evaluation unit
106 Fusion unit
107 Open-loop and/or closed-loop control unit
108 Second evaluation unit
109 Memory unit
110 Central server
111 Third interface
112 Third evaluation unit
120 Transmitter/receiver unit
201-207 Method steps

The invention claimed is:

1. A driver assistance system for assisting a driver when operating a vehicle F in a transportation route network, the system comprising:
   a first interface to provide navigation data ND relating to the transportation route network;
   a position detection unit to detect a position PF of the vehicle F;
   a second interface to provide at least following first data D1 relating to objects $O1_i$, the objects $O1_i$ being arranged along transportation routes of the transportation route network, where i=1, 2, ..., I, I≥1: object type $OA(O2_i)$, position $POS(O1_i)$, and risk index $INDEX(O1_i)$;
   a sensor system to scan current surroundings of the vehicle F at the position PF in order to generate surroundings data U(PF);
   a first evaluation unit to determine second data D2 relating to objects $O2_j$ based on the surroundings data U(PF), wherein the second data D2 relating to objects $O2_j$ at least include following information, wherein l=1, 1, 2, ..., L, L≥0: object type $OA(O2_j)$, position $POS(O2_2)$, and risk index $INDEX(O2_j)$, wherein the INDEX(x) indicates a risk for the vehicle F and/or its occupants in a collision with a respective object x;
   a fusion unit to match and fuse the first data D1 and the second data D2 to form third data D3=D3(D1, D2), wherein the third data relate to objects $O3_v$ which result from matching and fusing of the first data D1 and the second data D2 from objects $O1_i$ and $O2_j$, where v=1, 2, ... V, V≥1, V≤I+L, and $O3_v \in \{O1_i, O2_j\}$, and wherein risk indices $INDEX(O3_v)$ are assigned to the objects $O3_v$ based on risk indices $INDEX(O1_i)$ and $INDEX(O2_j)$; and
   an open-loop and/or closed-loop control unit to execute at least one assistance function UF in order to assist operation of the vehicle F, wherein the at least one assistance function UF is executed depending on the third data and the navigation data ND, UF=UF(D3, PF, ND).

2. The driver assistance system according to claim 1, wherein if no unique risk index $INDEX(O2_j)$ is determinable for an object $O2_j$, the object $O2_j$ is assigned an $INDEX(O2_j)$ which corresponds to a highest risk for the vehicle F and/or its occupants in a collision of the vehicle with the object $O2_j$.

3. The driver assistance system according to claim 1, wherein the system comprises a second evaluation unit to determine open spaces $FF_p$ which the vehicle F is able to use without risk in its current surroundings, where p=1, 2, ..., wherein the second evaluation unit determines the open spaces $FF_p$ taking into account the navigation data ND and/or the first data D1 and/or the second data D2 and/or the third data D3, and the at least one assistance function UF is executed depending on the determined open spaces $FF_p$, UF=UF(D3, ND, $FF_p$).

4. The driver assistance system according to claim 1, wherein the system comprises:
   a memory unit to store the first data D1; and
   a transmitting/receiving unit to transfer first data D1*  via a mobile data transfer from a central server to the memory unit in order to update the first data D1 stored in the memory unit.

5. The driver assistance system according to claim 1, wherein the fusion unit performs a correspondence check of the first data D1 and the second data D2 and gives priority to the second data D2 if there are one or more discrepancies among the first data D1 and the second data D2.

6. The driver assistance system according to claim 1, wherein the at least one assistance function UF includes one or several of following functions:
   output of a piece of information;
   activation or deactivation of a driver assistance system or a vehicle function; and
   autonomous intervention in longitudinal and/or lateral control/closed-loop control of the vehicle F.

7. The driver assistance system according to claim 1, wherein the system comprises:

a third interface to provide a current driving status Z(t) of the vehicle F; and a third evaluation unit to determine based on the current driving status Z(t) whether the current driving status Z(t) is a safe or an unsafe driving status, and if the third unit determines an unsafe driving status, the open-loop and/or closed-loop control unit executes an assistance function UF which performs autonomous intervention in longitudinal and/or lateral control/closed-loop control of the vehicle F, such that a predicted collision of the vehicle F with objects $O3_v$ located in surroundings of the vehicle F is prevented, or, if predicted collision prevention is not possible, a controlled collision of the vehicle F with an eligible object $O3_v$ in surroundings of the vehicle F, which has lowest risk index value INDEX($O3_v$), is initiated in a targeted manner.

8. The driver assistance system according to claim 1, wherein the surroundings data U(PF) generated by the sensor system are evaluated with respect to one or several pieces of following information:

3D shape of the objects $O2_j$;

type of the objects $O2_j$;

positioning of the objects $O2_j$ relative to the vehicle F;

dynamic state of the objects $O2_j$;

meteorological conditions in the vehicle surroundings;

type and condition of the ground surface in the vehicle surroundings; and type and condition of the transportation route traveled by the vehicle.

9. The driver assistance system according to claim 1, wherein the system comprises:

a unit to determine a most probable route FR of the vehicle F based on a current position PF of the vehicle F;

a third interface to provide a current driving status Z(t) of the vehicle F; and a prediction unit to determine a risk R based on the route FR, the current driving status Z(t), and the third data D3, where R=R(FR, Z(t), D3), wherein the risk R indicates a probability of occurrence of a critical driving situation for the vehicle F and the route FR, wherein the risk R is output and, if a critical driving situation occurs, the open-loop and/or closed-loop control unit executes an assistance function UF in which autonomous intervention in longitudinal and/or lateral control of the vehicle F is triggered in such a manner that it prevents a predicted collision of the vehicle F with objects $O3_v$ located in surroundings of the vehicle F or, if prevention of a predicted collision is not possible, causes a controlled collision of the vehicle F with an eligible object $O3_v$ in surroundings of the vehicle F in a targeted manner, the eligible object $O3_v$ having relatively lowest risk index value INDEX($O3_v$).

10. A method of assisting a driver when operating a vehicle F in a transportation route network, the method comprising:

providing navigation data ND relating to the transportation route network;

detecting a position PF of the vehicle F;

providing at least following first data D1 relating to objects $O1_i$, the objects $O1_i$, being arranged along transportation routes of the transportation route network, where i=1, 2, . . . , I, I≥1: object type OA($O1_i$), position POS($O1_i$), and risk index INDEX($O1_i$);

scanning current surroundings of the vehicle F at the position PF in order to generate surroundings data U(PF);

determining second data D2 relating to objects $O2_j$ based on the surroundings data U(PF), wherein the second data D2 relating to objects $O2_j$ at least include following information, wherein l=1, 2, . . . , L, L≥0: object type OA($O2_j$), position POS($O2_j$), and risk index INDEX($O2_j$), wherein the INDEX(x) indicates a risk for the vehicle F and/or its occupants in a collision with a respective object x;

matching and fusing the first data D1 and the second data D2 to form third data D3=D3(D1, D2), wherein the third data relate to objects $O3_v$ which result from matching and fusing of the first data D1 and the second data D2 from objects $O1_i$ and $O2_j$, where v=1, 2, . . . V, V≥1, V≤I+L, and $O3_v$ ϵ{$O1_i$, $O2_j$}, and wherein risk indices INDEX($O3_v$) are assigned to the objects $O3_v$ based on risk indices INDEX($O1_i$) and INDEX($O2_j$); and executing at least one assistance function UF in order to assist operation of the vehicle F, wherein the at least one assistance function UF is executed depending on the third data and the navigation data ND, UF=UF(D3, PF, ND).

11. The driver assistance system according to claim 6, wherein the peice of information is a warning or an alert.

12. The driver assistance system according to claim 6, wherein the output of the peice of information is optical, acoustic, or haptic.

* * * * *